United States Patent Office 2,790,919
Patented Apr. 30, 1957

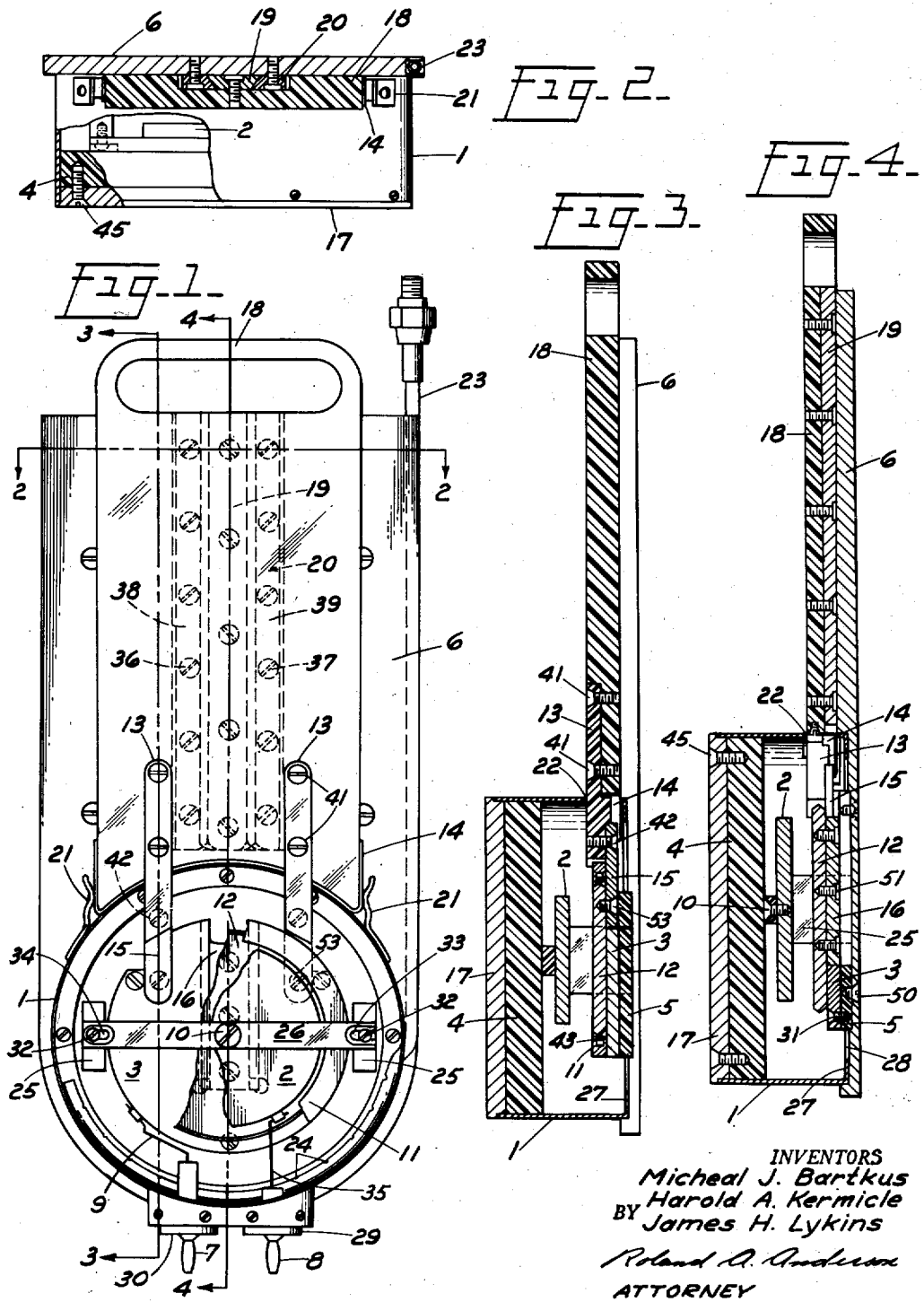

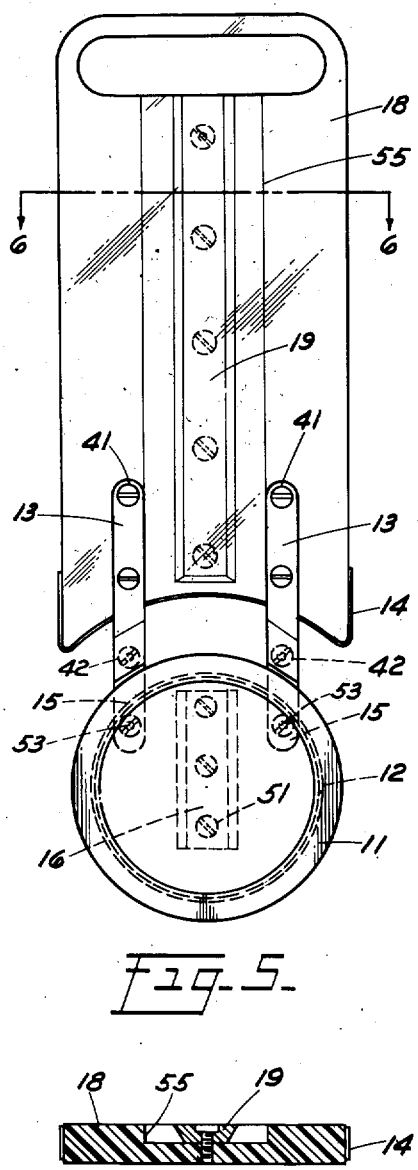
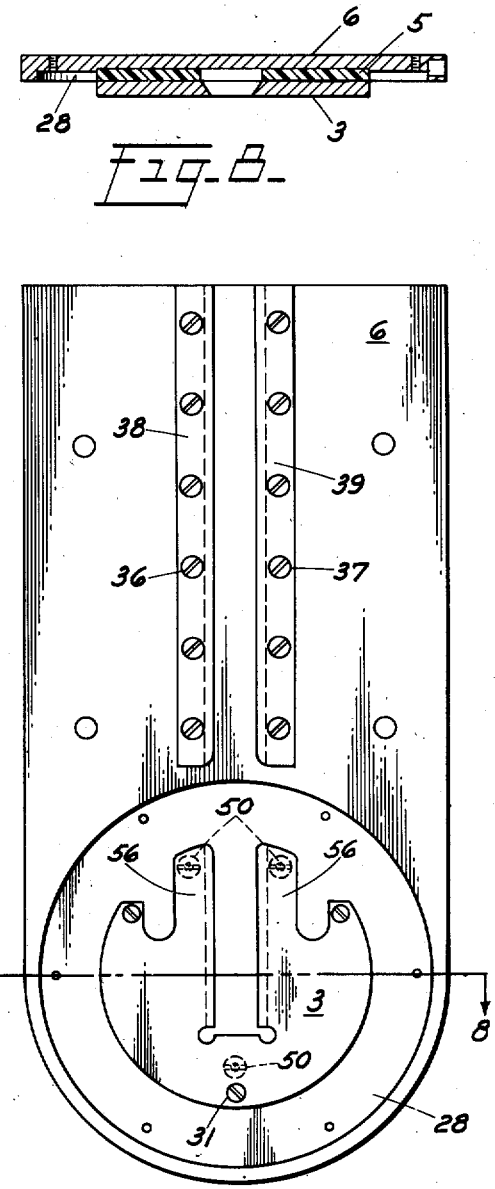

2,790,919

IONIZATION CHAMBER FOR FISSION COUNTING

James H. Lykins, Michael J. Bartkus, and Harold A. Kermicle, Oak Ridge, Tenn., assignors to the United States of America as represented by the United States Atomic Energy Commission Application September 29, 1950, Serial No. 187,638

6 Claims. (Cl. 313—54)

Our invention relates to ionization chambers, and more particularly to an ionization chamber especially adapted for use in the measurement of fission in samples of material, such as in the uranium isotope 235 in the solid phase.

In enriching normal uranium in respect to its isotope of atomic weight 235, for example, it is desirable to determine, as a control on the refining process, the exact degree of enrichment at various steps in the process, including the initial step and the point of disposal of waste material. This requires isotopic analysis.

Uranium comprises three isotopes having atomic weights 234, 235 and 238, respectively. Since in normal uranium the isotope 234 is present only as one part in 17,000, its contribution may be neglected. Also, the isotope 235 may be distinguished from the isotope 238, since the former may be made to fission by slow (thermal) neutrons, which do not fission the 238 isotope.

One method of isotopic analysis utilizes the mass spectrometer, but this requires conversion of the sample to the gaseous phase, and since the spectrometer has only a limited range, it may require a number of spectrometers to adequately cover a suitable range of sample mixtures. Another method of isotopic analysis is to fission the uranium isotope 235 with slow neutrons, as indicated above. The ionization resulting from the action of the fission fragments is then measured using an ionization chamber. However, the ionization chambers ordinarily employed in the prior art for fission counting contemplated the use of air as an ionization medium, but air has a relatively high coefficient of electron attachment which necessitated the collection of ions instead of electrons. Collection of ions, which move slower than electrons, serves as a limitation on the counting rate and the usefulness of the ionization chamber as a counter, since it was not suitable for measuring the more highly enriched samples of uranium 235 at the higher counting rates. Another disadvantage or limiting factor was the high background noise level resulting from excess spacing of electrodes which provided longer paths of travel for the alpha particles emitted by the uranium 238, resulting in larger alpha pulse height background noise, and appreciable inter electrode capacity resulting from the use of relatively large collector plates. Further, the spacing of electrodes in the conventional chambers of the prior art was difficult to determine, and adjustments were not easily made.

Applicants with a knowledge of all these defects in and objections to the arrangements of the prior art have for an object of their invention the provision of an ionization chamber having a gas with a low coefficient of electron attachment.

Applicants have as another object of their invention the provision of an ionization chamber having high counting rate characteristics resulting from the collection of electrons produced in the sensitive volume of the chamber.

Applicants have as another object of their invention the provision of an ionization chamber having an improved reflector for increasing the slow neutron flux, and, in turn, increasing the sensitivity by increasing the probability of fission of more uranium 235 atoms of any one sample, and improving the signal to background noise ratio.

Applicants have as a further object of their invention the provision of an ionization chamber having reduced electrode spacing for decreasing the alpha pulse height and, in turn, the background to signal ratio.

Applicants have as a still further object of their invention the provision of an ionization chamber having reduced electrode capacity for increasing signal pulse height and improving the background noise ratio.

Applicants have as a still further object of their invention the provision of an ionization chamber having improved electrode mountings for better positioning and more accurate electrode spacing and adjustment.

Other objects and advantages of our invention will appear from the following specification and accompanying drawings, and the novel features thereof will be particularly pointed out in the annexed claims.

In the drawings, Fig. 1 is a plan view of our improved ionization chamber, sample holder, and mounting, with the cover to the chamber removed. Fig. 2 is a sectional view taken along line 2—2 of Fig. 1 looking toward the chamber. Fig. 3 is a longitudinal sectional view of the same arrangement, taken along the line 3—3 of Fig. 1 with electrical leads omitted. Fig. 4 is a longitudinal sectional view of the same arrangement taken along line 4—4 of Fig. 1 with electrical leads omitted. Fig. 5 is a plan view of the handle and sample holder of my improved ionization chamber. Fig. 6 is a cross-sectional view taken along the line 6—6 of Fig. 5. Fig. 7 is a plan view of the base, track, and lower electrode of my improved ionization chamber. Fig. 8 is a cross-sectional view taken along the line 8—8 of Fig. 7.

Referring to the drawings in detail, 6 designates an elongated base of aluminum or other suitable material having a longitudinal groove extending down along one edge for the reception of a tube 23 which projects through an opening therein and along the inner wall of casing 1. The upper end of the tube 23 is provided with an appropriate fitting for connection to a source of gas or to a line carrying gas under pressure. Spaced openings 24 in the wall of that portion of the tube 23 which projects into the casing 1 serve to diffuse gas, preferably nitrogen, having a low coefficient of electron attachment, into the chamber formed by such casing. The casing also has a lower annular flange 27 for seating in circular recess 28 in the base 6. Screws or other appropriate means pass through the flange and seat in the base 6 for retaining the casing or shell 1 in place. Seated in polystyrene washers 29, 30, held in place in the shell or casing 1 by set screws which pass through the casing and into the washers are contacts 7, 8, connected to the electrodes of the ionization chamber in the manner described hereinafter. Positioned on the base 6 and secured thereto through spaced insulators (not shown) or through a circular or insulating disk 5 and screws 31 and 50 is a high voltage electrode 3 having an open ended slot formed in its central portion and cut away walls to define a pair of extensions 56, 56. Positioned above the high voltage electrode 3 and in spaced relation thereto and supported by an insulator arrangement is a smaller collector electrode 2. The collector electrode is maintained in adjusted relation with respect to the high voltage electrode by a pair of spaced insulator supports 25, 25, preferably of Lucite, bridged by a cross member 26. The insulator supports 25, 25 are joined to the base 6 by screws or other appropriate means. The ends of the cross member 26 are slotted to receive screws 32, 32. One slot 33 may be open ended while the other 34 may be substantially elliptical in configuration. This slot arrangement permits longitudinal adjustment of the cross member 26 with respect to the insulators 25, 25. Screw 10 passes through cross member 26 and threads into collector electrode 2 to mount it thereon and for maintaining these elements in assembled relation. For providing external electrical continuity, contact 7 is joined to high voltage electrode 3 by an appropriate lead 9, and contact 8 is coupled to collector electrode 2 by lead 35.

Positioned on the elongated base 6 next adjacent to the ionization chamber by a series of screws 36, 37, is a track made up of spaced strips 38, 39 having beveled or undercut edges for the reception of a dove-tailed strip 19 on insulated handle 18, preferably of polystyrene material, to permit sliding engagement therewith. Strip 19 is positioned centrally of a longitudinal recess 55 in the under side of handle 18 which is adapted to receive the two track elements or spaced strips 38, 39. The forward edge of handle 18 has a metallic reinforcing rim 14 attached to the handle by screws or other suitable means. Secured to the handle 18 by screws 41, 41 and projecting forwardly therefrom are a pair of legs 13, 13 with metallic extensions 15, 15 joined thereto through screws 42. These extensions are secured to the underside of a sample holder 12 by screws 53. The sample holder which may be of the type disclosed in the co-pending application of Stinson, Serial No. 164,010 filed May 24, 1950, wherein a sample holder body 12 has a recess in its upper surface for the reception of a sample plate upon which is mounted a sample of uranium or other test material. An annular retaining ring 11 having a lip portion overhanging the sample plate as indicated in Fig. 1, serves to position and retain the sample in place. The retaining ring 11 is yieldingly held in position by a spring clip 43 which seats in a groove in the wall thereof and engages over a shoulder on the sample holder body 12. A dove-tailed tongue 16 is secured to the under surface of the body 12 of the holder by screws 51 and is adapted to co-act with the track 20 and to slide into the open ended slot of electrode 3 for engagement with the walls of the extensions 56, 56. In order to facilitate the positioning of the sample between the electrodes 2 and 3, a slot 22 is formed in the wall of the spun Phosphor bronze case or shell 1 for the passage of the holder 11 and handle 18. Resilient fingers 21 are mounted on and extend outwardly from the walls of the case 1 adjacent the extremities of the slot and serve to frictionally engage the reinforcing rim 14 on handle 18 to provide continuity of shielding. Screws or other appropriate mounting means may be employed for this purpose. In addition, it may be desirable to provide a reinforcing rim 14 around the edge of the handle 18 over the portion engaged by the fingers 21, 21. This tends to provide continuity of shielding.

The ionization chamber is closed by a cover 17 which has a reduced portion that telescopes within the casing 1 and carries a series of screws which thread into the cover and pass through spaced openings in the casing for interlocking the cover 17 with the casing 1. Secured to the inner surface of the cover 17 is a disk 4 of wax which acts as a slow neutron reflector and tends to increase the neutron flux in the chamber. The wax 4 may be secured to cover 17 by molding it directly thereto, or by separately molding it and securing it to the cover through screws 45 which pass through the cover and into the block of wax, as shown in Figs. 2 and 4.

In its operation, the sample is subjected to the action of slow (thermal) neutrons from an appropriate source (not shown) positioned externally of the chamber. The uranium 235 isotope of the sample is fissioned by the neutrons, and the fission fragments moving through the sensitive volume or space within the chamber serve to ionize the gases therein. Where nitrogen is fed through the tube 23 and out through the openings 24 therein, it is diffused throughout the chamber. As nitrogen has a low coefficient of electron attachment, the electrons released by the action of the fission fragments in ionizing the gas, remain available for collection by the collecting electrode 2. The collector plate is connected through contact 8 to an appropriate amplifier and recorder so that the voltage pulses serve as a measure of the relative abundance of the uranium 235 isotope. In short, the fissioning of a sample of known size with slow neutrons, and the collection of the electrons resulting from ionization of the gas of the sensitive volume by the fission fragments serve as an evaluation of the uranium 235 isotope in the sample.

While the present invention may be useful in many different arrangements for determining fission, one such arrangement for which it is particularly suited is disclosed in the co-pending application of Beyer et al., Serial No. 236,632, filed July 13, 1951. Further, for purposes of clarity, it will be noted that electrical leads have been omitted from Figs. 3 and 4, and the ring 11 has been omitted from the sample holder in Fig. 4.

Having thus described our invention, we claim:

1. An ionization chamber for measuring ionization as a function of fission comprising a housing defining an ionizing chamber, a plurality of electrodes disposed within said chamber in spaced relation, means for positioning a sample of known size between said electrodes for bombardment by a source of slow neutrons, and a conduit for leading a gas having a low coefficient of electron attachment into the chamber, whereby to facilitate the collection and measurement of electrons as a function of fission.

2. An ionization chamber for measuring ionization as a function of fission comprising a housing defining a chamber, a pair of electrode plates disposed within the chamber in parallel spaced relation, a slot in one wall of said housing, a track positioned adjacent the casing and in alignment with the slot, and means for movably mounting a sample on said track for travel into said chamber to permit positioning thereof between said plates, whereby to facilitate its exposure to the action of a slow neutron source to fission the sample and produce ionization within the chamber.

3. An ionization chamber for measuring ionization as a function of fission comprising a casing defining an ionizing chamber, a pair of electrodes disposed within the chamber in parallel spaced relation, one of said electrodes being smaller than the other to provide an electron collector, a conduit extending into said casing for feeding a gas having a low coefficient of electron attachment into said chamber, and means for inserting a sample between said electrodes for exposure to a source of slow neutrons to produce fission for ionizing the gases of said chamber.

4. An ionization chamber for measuring ionization as a function of fission comprising a casing defining an ionizing chamber, a pair of electrodes disposed within the chamber in spaced relation, a conduit for feeding a gas having a low coefficient of electron attachment into the chamber, means for positioning a sample between said electrodes for exposure to a slow neutron source for producing fission therein and ionization in the chamber, and a slow neutron reflector positioned in the chamber adjacent one of said electrodes for directing the neutrons and increasing the ionization.

5. An ionization chamber for measuring ionization as a function of fission comprising a casing defining an ionizing chamber, a pair of electrode plates disposed within the chamber in parallel spaced relation, one of said electrode plates being smaller than the other to provide an electron collector, a conduit for leading a gas having a low coefficient of electron attachment into the casing, means for positioning a sample between the electrodes for exposure to a slow neutron source to produce fission therein and ionization in the chamber, and a slow neutron reflector positioned behind the smaller of the electrode plates to direct the neutrons and increase ionization.

6. An ionization chamber for measuring ionization as a function of fission comprising a casing defining an ionizing chamber, a conduit extending into the casing and along the wall thereof for introducing a gas having a low coefficient of electron attachment, said conduit having a series of spaced exit openings for insuring a uniform distribution of gas supplied to the chamber, a plurality of electrodes disposed within the casing in spaced relation, and means for positioning a sample between said electrodes for exposure to an external slow neutron source to produce fission therein and ionization in the chamber.

References Cited in the file of this patent

UNITED STATES PATENTS 2,496,123     East et al. _____ Jan. 31, 1950